US006826120B1

United States Patent
Decker et al.

(10) Patent No.: US 6,826,120 B1
(45) Date of Patent: Nov. 30, 2004

(54) CHILD WRISTWATCH TYPE COMMUNICATIONS DEVICE

(76) Inventors: Lindy Decker, 6080 E. Menlo La., Inverness, FL (US) 34452; John Wilson, 6080 E. Menlo La., Inverness, FL (US) 34452

(*) Notice: Subject to any disclaimer, the term of this patent is extended or adjusted under 35 U.S.C. 154(b) by 55 days.

(21) Appl. No.: 10/392,722

(22) Filed: Mar. 20, 2003

(51) Int. Cl.[7] ................... G04B 47/00; G04B 47/02; H04M 1/00; H04B 1/38
(52) U.S. Cl. ................... 368/10; 368/13; 368/281; 379/433.1; 455/575.6
(58) Field of Search ................... 368/10, 13, 47, 368/281, 282; 379/433.01, 433.1; 455/575.1, 575.6

(56) References Cited

U.S. PATENT DOCUMENTS

| | | | | |
|---|---|---|---|---|
| 5,224,076 A | * | 6/1993 | Thorp | 368/10 |
| 5,331,608 A | * | 7/1994 | Umemoto et al. | 368/10 |
| 6,158,884 A | * | 12/2000 | Lebby et al. | 368/282 |
| 6,192,253 B1 | * | 2/2001 | Charlier et al. | 455/575.7 |
| 6,564,075 B1 | * | 5/2003 | Mitamura | 455/575.1 |
| 6,590,835 B2 | * | 7/2003 | Farine et al. | 368/10 |
| 6,681,014 B1 | * | 1/2004 | Ghassabian | 379/433.1 |

* cited by examiner

Primary Examiner—Vit W. Miska

(57) ABSTRACT

A child's wristwatch type device featuring simple safety and security communications capability. The device will allow a child to call one of several preset numbers, including 911, with a single push of a button, thereby providing peace of mind for both parents and child. The device is unique in that a child cannot run up a large phone bill with call to friends, as they might tend to do with a ordinary cell phone. The invention essentially comprises a wristwatch like housing with a matching lid attached along the backside by spring loaded hinge means. A wireless telephone means with retractable antenna is mounted in the base housing, along with a rechargeable battery. In the closed position, a digital clock and small speaker is exposed on the top side of the lid for providing voice or ringer sound. When the lid is open, a circular cover plate forms the top surface of the base housing and has several push buttons, a microphone, and an ON/OFF switch. The push buttons include both call buttons (example: home, mother, father, 911) and operations function buttons (example: end call, clear display, set clock, etc.). When the lid is closed, the ON/OFF switch will automatically place the phone in idle mode. The device also has a special securing means to assure that the child doesn't remove the device from their wrist or lose it. In use, to place a call the child simply opens the lid to the device and pushes one of the available call buttons. To receive a call, the child would open the lid and start talking.

20 Claims, 3 Drawing Sheets

CHILD WRISTWATCH TYPE COMMUNICATIONS DEVICE

BACKGROUND OF THE INVENTION

1. Field of the Invention

The present invention relates to a child's communications device for use in connection with maintaining constant communications between children and specific designated contacts. The child's wristwatch type communications device has particular utility in allowing a child to make a 911 call or a call to a parent by the push of a single button.

2. Description of the Prior Art

In today's world there is an ever growing need to be able to stay in contact with children at all times. It would be desirable for a child to wear a special wristwatch type telephone device where he/she could contact a small number of pre-selected family members or 911 with the push of a single button conveniently located and properly marked on the device. Additionally, the parent or other designated contact person could communicate with the child at any time to determine the child's whereabouts or for other communications purposes.

The use of wristwatch type telephone devices is known in the prior art. For example, U.S. Pat. No. 5,274,613 to Seager discloses a wristwatch radiotelephone, which allows the radiotelephone and timekeeping portion of the device to be removed from the wristband for use as a normal telephone. However, the Seager '613 patent is different in structure from that of the present invention and does not disclose a small, wrist type device that will only allow the user to quickly communicate with a handful of selected people, as will as make contact with 911 authorities, by pushing one of a small number of dedicated buttons.

U.S. Pat. No. 6,430,110 to Baroche discloses a multifunction wristwatch with an electronic device that can include a telephone with the dialing keys located around the periphery of the watch body. However, the Baroche '110 patent does not disclose a small, wrist type device that will only allow the user to quickly communicate with a handful of selected people, as will as make contact with 911 authorities, by pushing one of a small number of dedicated buttons.

Similarly, U.S. Pat. No. 6,035,035 to Firooz discloses a wrist mounted telephone device that has a cellular telephone mechanism and battery power source attached to the wrist. However, the Firooz '035 patent is different in structure from that of the present invention and does not disclose a small, wrist type device that will only allow the user to quickly communicate with a handful of selected people, as will as make contact with 911 authorities, by pushing one of a small number of dedicated buttons.

Lastly, U.S. Pat. No. 5,487,108 to Atkins et al., U.S. Pat. No. 5,659,611 to Saksa, and D456,791 to Forakis et al. disclose apparatus that may be of general interest and pertinent to the construction and design of the present invention. The Atkins '108 patent discloses a programmable dialer for a mobile telephone, which allows calls to only be made to specific, preprogrammed numbers. The Saksa '611 patent discloses a wrist telephone with the microphone and speaker releasably mounted to the tips of the thumb and one finger for use. Finally, the Forakis '791 patent discloses the design for a telephone watch. However, all of these patents disclose devices that are different in structure from that of the present invention and none disclose a small, wrist type device that will only allow the user to quickly communicate with a handful of selected people, as will as make contact with 911 authorities, by pushing one of a small number of dedicated buttons.

While the above-described devices fulfill their respective, particular objectives and requirements, the aforementioned patents do not describe a child wristwatch type communications device that allows a child to communicate with a small number of pre-selected family members or 911 by the pushing a single button conveniently located and properly marked on the wrist worn device.

Therefore, a need exists for a new and improved wristwatch type communications device that can be worn by children for communicating with a handful of pre-determined contacts, as well as with 911. In this regard, the present invention substantially fulfills this need. In this respect, the child wristwatch type communications device according to the present invention substantially departs from the conventional concepts and designs of the prior art, and in doing so provides an apparatus primarily developed for the purpose of allowing parents to maintain contact with their children at all times.

SUMMARY OF THE INVENTION

In view of the foregoing disadvantages inherent in the known types of wristwatch type telephone devices now present in the prior art, the present invention provides an improved child wristwatch type communications device, and overcomes the above-mentioned disadvantages and drawbacks of the prior art. As such, the general purpose of the present invention, which will be described subsequently in greater detail, is to provide a new and improved child wristwatch type communications device and method that has all the advantages of the prior art mentioned heretofore and many novel features that result in a child wristwatch type communications device which is not anticipated, rendered obvious, suggested, or even implied by the prior art, either alone or in any combination thereof.

The present invention discloses a child's wristwatch type communications device with such appealing features as safety, security, economy, ease of use, convenience, and simplicity. With this device parents know that a child can call anyone of a several preset numbers, including 911, with a single push of a button. This is especially useful in emergency situations and will provide tremendous peace of mind for parents, as well as for the child. The child can also call one of several numbers, such as home, mother, and father for other non-critical conversations. However, the child would not be able to run up a large phone bill with calls to friends, as they might tend to do with a ordinary cell phone. The device will be about the size of one of the larger wristwatches presently available on the market.

To attain this, the present invention essentially comprises a swallow, closed-bottom, cylindrical base housing with a matching lid attached along the backside by hinge means. The lid will typically be spring loaded so as to snap shut and remain in a closed position until opened for use. A wireless telephone means is mounted in the base housing, along with a rechargeable battery. A battery charging port is included along one side of the base housing. Optionally, the device could be power by solar cell means. A retractable antenna is also mounted in the base housing. In the closed position, a digital clock and small speaker is exposed on the top side of the lid for providing time-of-day and voice or ringer sound. When the lid is open, a circular cover plate forms the top surface of the base housing and has several push buttons, a microphone, and an ON/OFF switch. The push buttons include both call buttons (example: home, mother, father, 911) and operational function buttons (example: end call, clear display, set clock, etc.). When the lid is closed, the ON/OFF switch will automatically place the phone in idle mode, turning off most functions, to conserve power. The device has a wristwatch type band with special securing means, which might include a nut and threaded bolt arrangement, to assure that the child doesn't remove or lose it.

In use, to place a call the child simply opens the lid to the device and pushes one of the available call buttons. In the case of a weak signal, he/she might also pull out the retractable antenna To receive a call, the child would open the lid and start talking. For additional convenience, the child could at any time obtain the time-of-day from the digital clock on the outside of the lid.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child wristwatch type communications device that provides in the apparatuses and methods of the prior art some of the advantages thereof, while simultaneously overcoming some of the disadvantages normally associated therewith.

It is another object of the present invention to provide a new and improved child wristwatch type communications device that may be easily and efficiently manufactured and marketed.

An even further object of the present invention is to provide a new and improved child wristwatch type communications device that has a low cost of manufacture with regard to both materials and labor, and which accordingly is then susceptible of low prices of sale to the consuming public, thereby making such communications devices economically available to the buying public.

Lastly, it is an object of the present invention to provide a new and improved method for immediately communicating with one's children.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
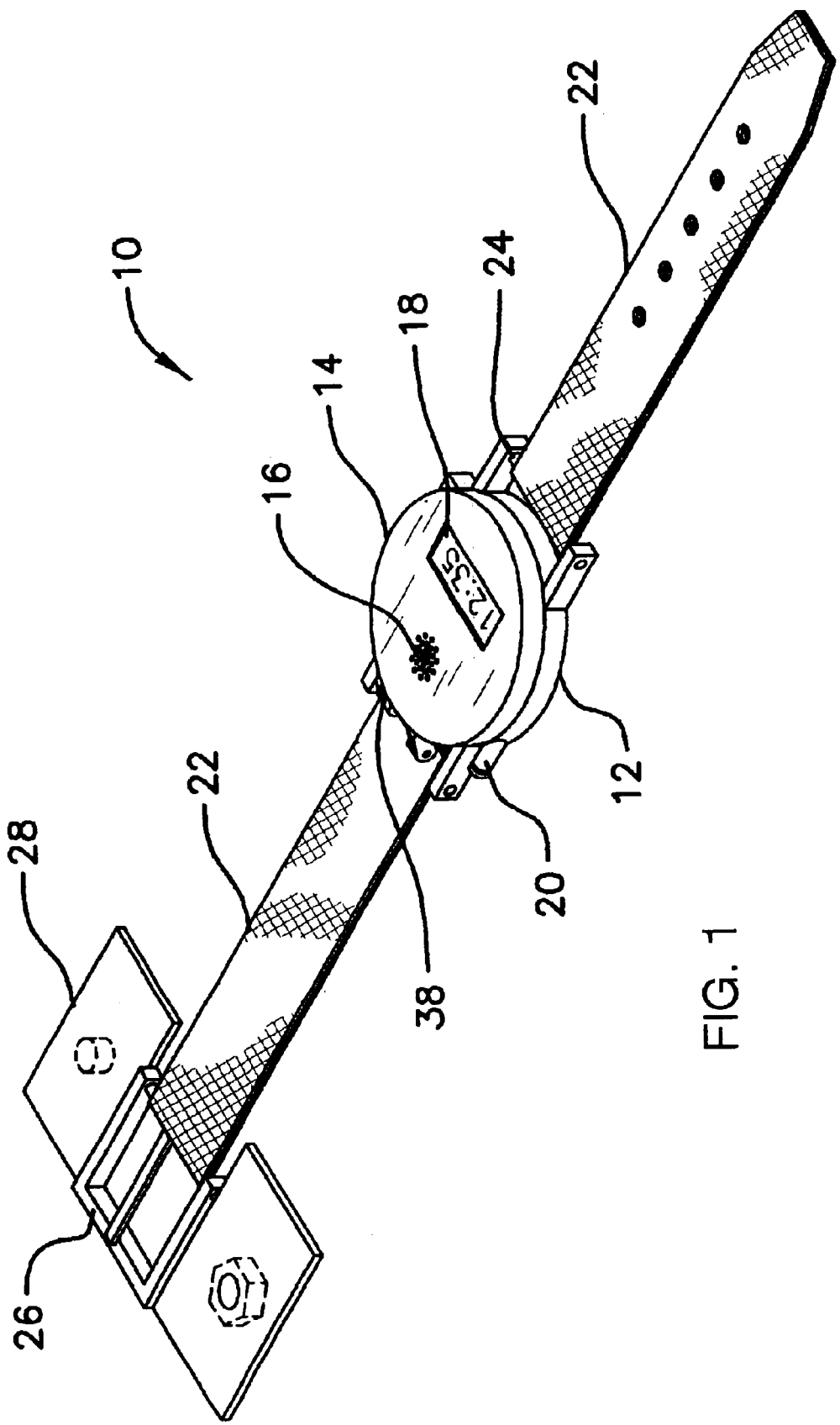
FIG. 1 is a top perspective view of the preferred embodiment of the child wristwatch type communications device in a closed non-use position, constructed in accordance with the principles of the present invention.

Referring now to the drawings, and particularly to FIGS. 1–4, a preferred embodiment of the child wristwatch type communications device of the present invention is shown and generally designated by the reference numeral 10.

Figure 2:
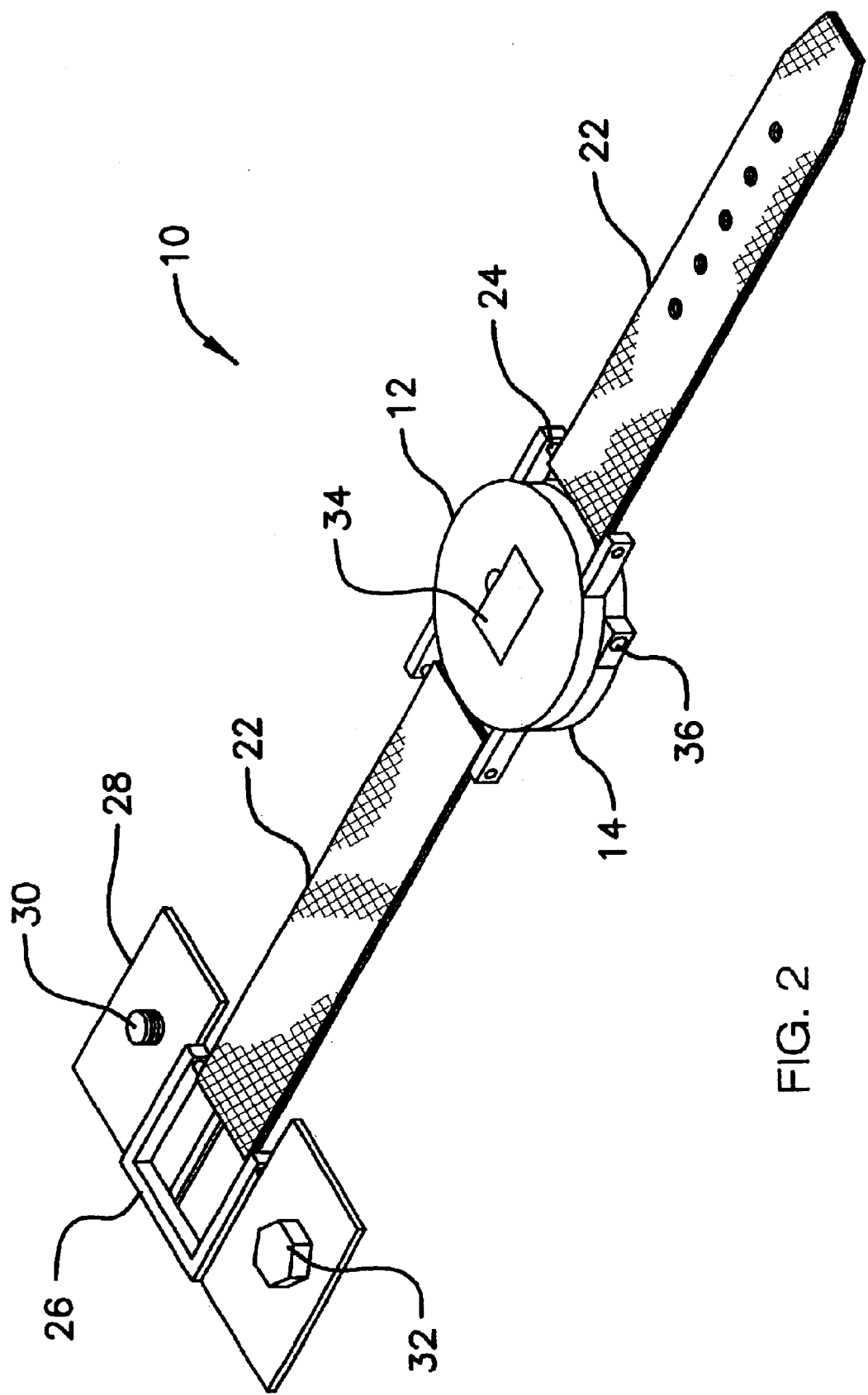
FIG. 2 is a bottom perspective view of the child wristwatch type communications device of the present invention.

In FIGS. 1 and 2, top and bottom perspective views of the new and improved child wristwatch type communications device 10 of the present invention for maintaining contact with children is illustrated and will be described. More particularly, the child wristwatch type communications device 10 has a swallow, closed-bottom, cylindrical wristwatch type base housing 12 with a matching top lid 14 hingedly attached at the back end. Circuitry for a battery powered wireless telephone means is mounted inside the base housing 12. With the lid 14 closed, a telephone speaker 16 and digital clock 18 are exposed to the user of the device. The speaker 16 is accessible with both the lid 14 open or closed. A small retractable antenna 20 also extends out from the base housing 12. The device has a typical two-piece band 22, that attaches to standard attaching post 24 located on the front and back sides of the base housing 12, and a buckle 26 attached at one end. Additionally, foldable security latch flaps 28 extends from each side of the buckle 26 with one flap containing a threaded bolt 30 and the other a captured nut 32 for securing the device on a child's wrist. Also, a battery compartment with access cover 34 is included on the bottom of the base housing 12, with a battery charger port 36 being accessible along the side of the base housing. Optionally, the device could be powered by solar cell means.

Figure 3:
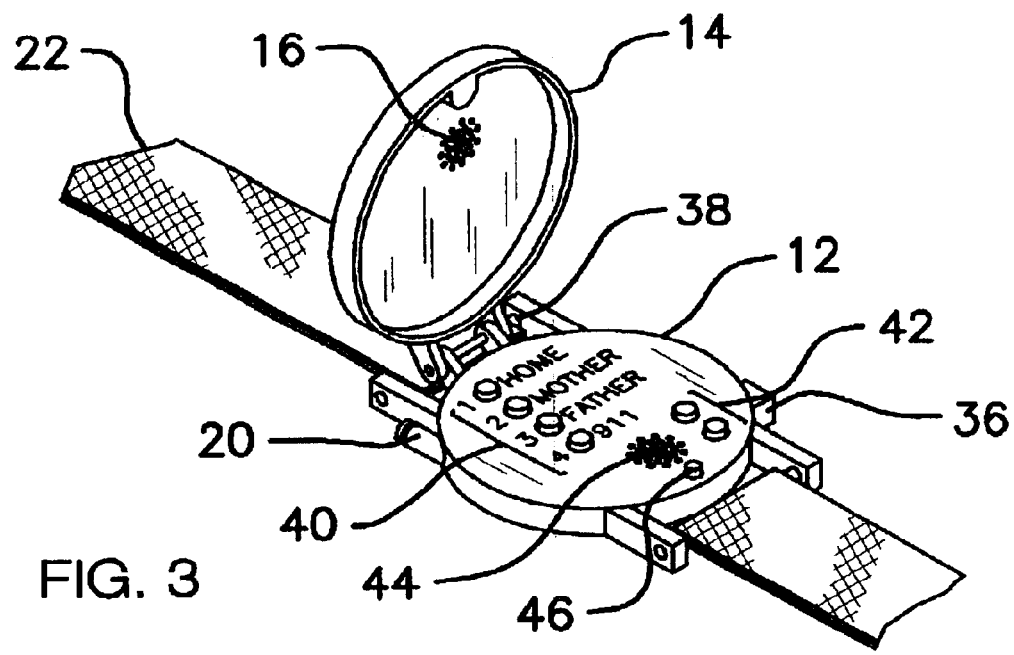
FIG. 3 is a top perspective view of the child wristwatch type communications device of the present invention in an open ready to use position.

FIG. 3 is a top perspective view of the child wristwatch type communications device of the present invention in an open ready to use position. This shows the lid 14 attached to the base housing 12 by hinge 38 means. The hinge can have a spring loaded mechanism for closing and holding the top lid shut. Optionally, a latching means can be used to hold the top lid shut. The top surface of the base housing 12 has a circular panel, which includes several preset call buttons 40, additional operational function buttons 42, a telephone microphone 44, and a power switch 46, which is used to place the device in standby mode when the top lid is closed in order to conserve power. The call buttons 40 are preset to numbers, such as home, mother, father, and 911 and the operational function buttons 42 are used for items like ending a call, clearing the display, setting the clock, etc.

Figure 4:
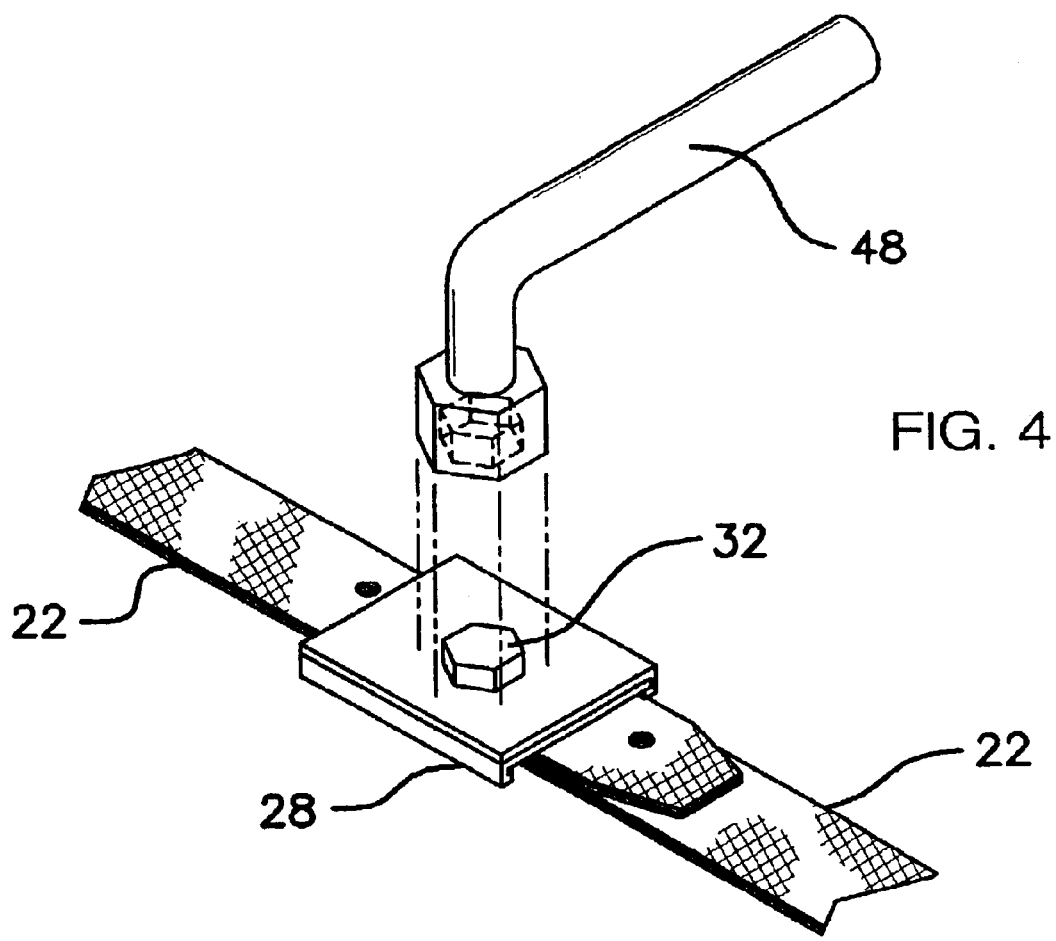
FIG. 4 is a perspective view showing the security latching mechanism of the child wristwatch type communications device of the present invention.

Finally, FIG. 4 is a perspective view showing the security latching mechanism of the child wristwatch type communications device of the present invention. This illustrates the securing flaps 28 folded and secured by nut 32 fastened on to the threaded post 30. An optional special tool 48 for applying the securing nut may be provided.

In use, it can now he understood that to place a call, the child simply opens the lid to the device and pushes one of the available call buttons. In the case of a weak signal, he/she would also pull out the retractable antenna. To receive a call, the child would open the lid and start talking. For additional convenience, the child could at any time obtain the time-of-day from the digital clock on the outside of the lid in the closed position.

While a preferred embodiment of the child wristwatch type communications device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the wristband of the device could be made from leather, plastic, cloth, light metal, or for high security purposes stainless steel, which would be difficult to cut off a child's arm. Also, a parent could preset any desirable call numbers in the device. Additionally, the device of the present invention could be used to communicate with doctors, employees, etc.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A child communications device, comprising:
   a swallow, closed-bottom, cylindrical wristwatch type base housing, said base housing having armband attaching posts mounted on front and back areas of cylinder walls;
   a matching shallow cylindrical top lid hingedly attached to one side of said base housing adjacent said back armband attaching posts;
   a wireless telephone means mounted inside said base housing, use buttons for said telephone means being mounted on a circular panel attached to the top of said base housing, said circular panel further comprising:
      a plurality of preset call buttons extending outward from said circular panel for placing a call by pushing one of said buttons;
      a microphone exposed on said circular panel for speaking into said wireless telephone;
      one or more operational function buttons further exposed on said circular panel; and
      an automatic ON/OFF switch located near the front rim of said circular panel for placing said telephone in a stand-by mode when said top lid is in closed position;
   a telephone speaker mounted in said top lid, said speaker being audible with said top lid in open or closed position for providing voice or ringer sound;
   a digital clock mounted in said top lid, said clock being visible from the top side of said lid in closed position;
   a retractable antenna mounted inside said base housing, said antenna extending outward from said base housing adjacent said back armband attaching post;
   a front wristband attached to said front armband attaching post, said front wristband having a series of buckle holes;
   a back wristband attached to said back armband attaching post;
   a buckle mounted to the outer end of said back wristband; and
   a security latching means attached to said buckle for preventing child from losing said communications device.

2. The device of claim 1, wherein said base housing and lid are fabricated from materials from the group comprised of: aluminum, brass, stainless steel, and molded plastic.

3. The device of claim 1, wherein said call buttons are used to talk to members of the group comprised of: home, mother, father, relative, neighbor, and 911.

4. The device of claim 1, wherein said operational function buttons are used to perform functions from the group comprised: ending a call, clearing display, setting clock, and adjusting telephone volume.

5. The device of claim 1, wherein said top lid is spring loaded for snapping and holding said lid in closed position.

6. The device of claim 1, wherein top lid is held closed by a latching means.

7. The device of claim 1, wherein said device is powered by battery means, said batteries being installed through a removable cover located on the bottom of said base housing.

8. The device of claim 7, wherein a battery charging port is provided on one side of said base housing.

9. The device of claim 1, wherein said device is power by solar cell means.

10. The device of claim 1, wherein said security latching means further comprises:
    a first foldable flap attached to one side of said buckle, said first foldable flap containing a threaded stud bolt; and
    a second foldable flap attached to the opposite side of said buckle, said second foldable flap containing a captured threaded nut, said flaps being folded so that said bolt aligns with said nut, said nut being tightened for securing said device to user's wrist.

11. The device of claim 10, wherein a custom tool is provided for quickly applying said threaded nut.

12. A child communications device, comprising:
    a swallow, closed-bottom, cylindrical wristwatch type base housing, said base housing having armband attaching post mounted on back and front area of cylinder walls, said base housing fabricated from materials from the group comprised of: aluminum, brass, stainless steel, and molded plastic;

a matching shallow cylindrical top lid hingedly attached to one side of said base housing adjacent said back armband attaching posts, said top lid being spring loaded for snapping and holding said lid in a closed position, said lid fabricated from materials from the group comprised of: aluminum, brass, stainless steel, and molded plastic;

a wireless telephone means mounted inside said base housing, use buttons for said telephone means being mounted on a circular panel attached to the top of said base housing, said circular panel further comprising:

a plurality of preset call buttons extending outward from said circular panel for placing a call by pushing one of said buttons, said call buttons used to talk to members of the group comprised of: home, mother, father, relative, neighbor, and 911;

a microphone exposed on said circular panel for speaking into said wireless telephone;

one or more operational function buttons further exposed on said circular panel, said operational function buttons used to perform functions from the group comprised: ending a call, clearing display, setting clock, and adjusting volume; and an automatic ON/OFF switch located near the front rim of said circular panel for placing said telephone in a stand-by mode when said top lid is in closed position;

a telephone speaker mounted in said top lid, said speaker being audible with said top lid in open or closed position for providing voice or ringer sound;

a digital clock mounted in said top lid, said clock being visible from the top side of said lid in closed position;

a retractable antenna mounted inside said base housing, said antenna extending outward from said base housing adjacent said back armband attaching post;

a battery mounted inside said base housing for powering said device, said battery being installed through a removable cover located on the bottom of said base housing;

a battery charging port extending from one side of said base housing;

a front wristband attached to said front armband attaching post, said front wristband having a series of buckle holes;

a back wristband attached to said back armband attaching post;

a buckle mounted to the outer end of said back wristband; and a security latching means attached to said buckle for preventing child from losing said communications device.

13. A method for maintaining telephonic contact with a child, comprising the steps of:

providing a communications device to be worn on the wrist of a child, said communications device being further comprised of:

a swallow, closed-bottom, cylindrical wristwatch type base housing, said base housing having armband attaching posts mounted on front and back areas of cylinder walls;

a matching shallow cylindrical top lid hingedly attached to one side of said base housing adjacent said back armband attaching posts;

a wireless telephone means mounted inside said base housing, use buttons for said telephone means being mounted on a circular panel attached to the top of said base housing, said circular panel further comprising:

a plurality of preset call buttons extending outward from said circular panel for placing a call by pushing one of said buttons;

a microphone exposed on said circular panel for speaking into said wireless telephone;

one or more operational function buttons further exposed on said circular panel; and an automatic ON/OFF switch located near the front rim of said circular panel for placing said telephone in a stand-by mode when said top lid is in closed position;

a telephone speaker mounted in said top lid, said speaker being audible with said top lid in open or closed position for providing voice or ringer sound;

a digital clock mounted in said top lid, said clock being visible from the top side of said lid in closed position;

a retractable antenna mounted inside said base housing, said antenna extending outward from said base housing adjacent said back armband attaching post;

a front wristband attached to said front armband attaching post, said front wristband having a series of buckle holes;

a back wristband attached to said back armband attaching post;

a buckle mounted to the outer end of said back wristband; and a security latching means attached to said buckle for preventing child from losing said communications device;

opening said top lid of said device by said child and pushing one of said call buttons for quickly placing a call to a preset number, said retractable antenna being extended for receiving a stronger signal;

opening said top lid of said device by said child for receiving an incoming call; and talking in reasonably close proximity to said microphone while listening to said speaker for both outgoing and incoming calls.

14. The method of claim 13, wherein said base housing and lid are fabricated from materials from the group comprised of: aluminum, brass, stainless steel, and molded plastic.

15. The method of claim 13, wherein said call buttons are used to talk to members of the group comprised of: home, mother, father, relative, neighbor, and 911.

16. The method of claim 13, wherein said operational function buttons are used to perform functions from the group comprised: ending a call, clearing display, setting clock, and adjusting telephone volume.

17. The method of claim 13, wherein said top lid is spring loaded for snapping and holding said lid in closed position.

18. The method of claim 13, wherein said device is powered by battery means, said batteries being installed through a removable cover located on the bottom of said base housing.

19. The method of claim 18, wherein a battery charging port is provided on one side of said base housing.

20. The method of claim 13, wherein said security latching means further comprises:

a first foldable flap attached to one side of said buckle, said first foldable flap containing a threaded stud bolt; and a second foldable flap attached to the opposite side of said buckle, said second foldable flap containing a captured threaded nut, said flaps being folded so that said bolt aligns with said nut, said nut being tightened for securing said device to user's wrist.

* * * * *